No. 746,551. PATENTED DEC. 8, 1903.
D. H. MONKS.
VALVE MECHANISM FOR BOTTLES.
APPLICATION FILED AUG. 18, 1902. RENEWED APR. 29, 1903.
NO MODEL. 2 SHEETS—SHEET 1.
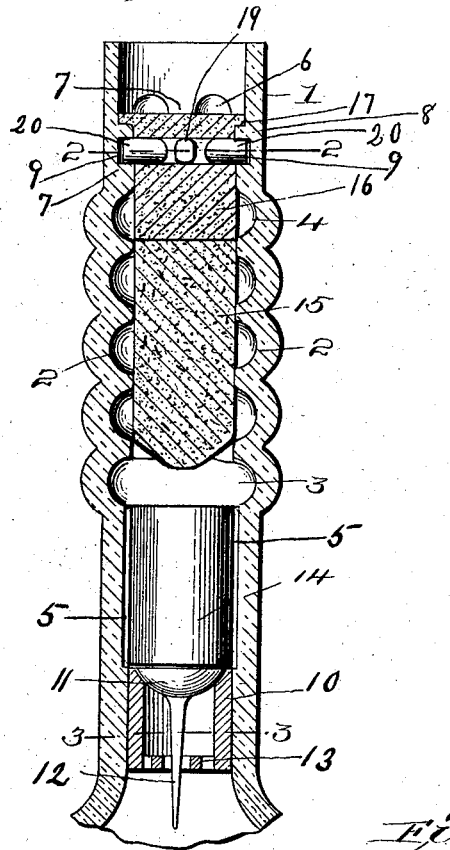
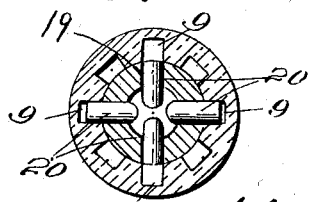
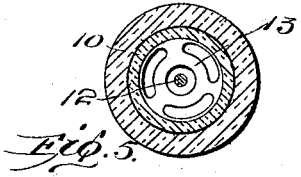
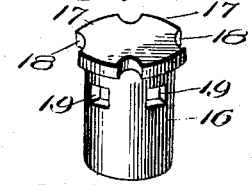
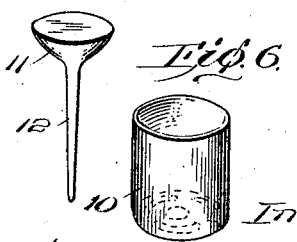
Witnesses: Inventor
Daniel H. Monks
by Grant Burroughs
Atty.

No. 746,551. PATENTED DEC. 8, 1903.
D. H. MONKS.
VALVE MECHANISM FOR BOTTLES.
APPLICATION FILED AUG. 18, 1902. RENEWED APR. 29, 1903.
NO MODEL. 2 SHEETS—SHEET 2.

Witnesses:
J. M. Fowler Jr.

Inventor:
Daniel H. Monks
by
Grant Burroughs
Atty

No. 746,551. Patented December 8, 1903.

UNITED STATES PATENT OFFICE.

DANIEL H. MONKS, OF FISHKILL-ON-THE-HUDSON, NEW YORK.

VALVE MECHANISM FOR BOTTLES.

SPECIFICATION forming part of Letters Patent No. 746,551, dated December 8, 1903.

Application filed August 18, 1902. Renewed April 29, 1903. Serial No. 154,893. (No model.)

*To all whom it may concern:*

Be it known that I, DANIEL H. MONKS, a citizen of the United States, residing at Fishkill-on-the-Hudson, in the county of Dutchess and State of New York, have invented certain new and useful Improvements in Valve Mechanism for Bottles, of which the following is a full, clear, and exact description, such as will enable those skilled in the art to which it appertains to make and use the same, reference being had to the accompanying drawings, forming a part of this specification.

The invention relates to improvements in valve mechanism for bottles of that class which are used to prevent the refilling of a bottle after it has been emptied of its original contents.

It consists in the novel construction, combination, and arrangements of parts, such as will be hereinafter fully described, pointed out in the appended claims, and illustrated in the accompanying drawings.

Figure 7:
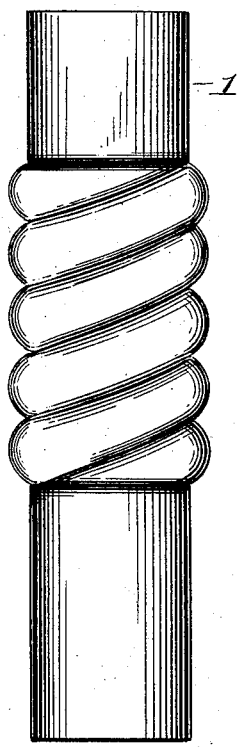
Figure 8:
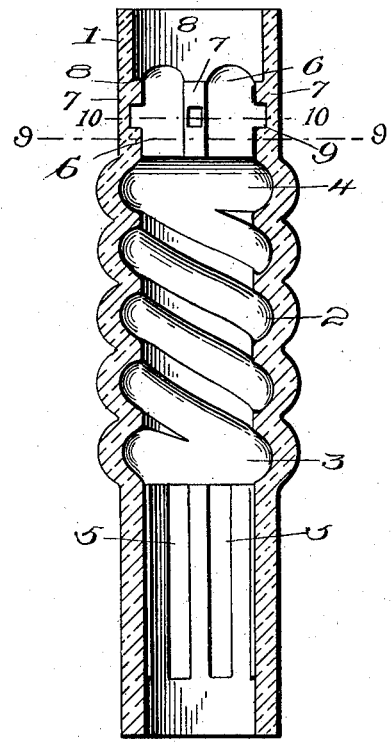
Figure 9:
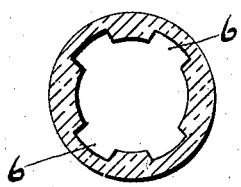
Figure 10:
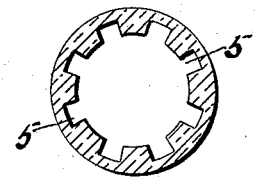

In the accompanying drawings, in which similar reference characters designate corresponding parts, Figure 1 is a longitudinal sectional view of a valve mechanism embodying the invention. Fig. 2 is a transverse sectional view on the line 2 2 of Fig. 1. Fig. 3 is a similar view on the line 3 3 of Fig. 1. Fig. 4 is a detail perspective view showing the locking-stopper. Fig. 5 is a similar view showing the valve. Fig. 6 is also a similar view showing the valve-seat. Fig. 7 is an elevation showing the exterior of the bottle-neck. Fig. 8 is a longitudinal sectional view of the bottle-neck with the valve mechanism removed. Fig. 9 is a transverse sectional view on the line 9 9 of Fig. 8. Fig. 10 is a similar view on the line 10 10 of Fig. 8.

The body of the bottle may be of any construction suitable in the premises. In the inner face of the neck 1 intermediate of its ends are the spiral grooves 2. Each of these grooves passes completely around the neck, so that its ends overlap. These grooves lead from the chamber 3, located adjacent to their inner ends, to the chamber 4, located adjacent to their outer ends. Leading from the chamber 3 toward the inner end of the neck are the longitudinal grooves 5, and leading from the chamber 4 toward the outer end of the neck are the longitudinal grooves 6. The latter are separated by the ribs 7, having on their outer ends the shoulders 8. In the inner face of each rib is an opening or socket 9 to receive the locking-bolts, to be described hereinafter.

In the inner end of the neck is fixed the seat 10, and adapted to register with the same is the valve 11, provided with the stem 12. The latter passes through the cross-piece 13, and thereby guides the valve in its movements. Immediately above the valve is the closing-weight 14, movable longitudinally in the neck. The inward movement of the closing-weight is limited by the valve engaging with its seat, and its outward movement is limited by the intermediate stopper 15. The intermediate stopper 15 is placed in the neck between the chambers 3 and 4, so that its upper end is flush with the chamber 4, and its lower end projects slightly into the chamber 3. Around the stopper 15 the grooves 2 form spiral passages leading from the inner chamber 3 to the outer chamber 4 past the said stopper.

In the outer end of the neck is inserted the locking-stopper 16. Projecting from the outer end of the stopper is the flange 17, adapted to engage with the shoulders 8 of the ribs 7. By the engagement of the flange with the shoulders the inward movement of the stopper when it is inserted in the bottle-neck. The flange is cut away adjacent to the grooves 6, as at 18, to permit a free flow of the liquid from the passages formed by the said grooves. Extending radially through the outer end of the stopper are the sockets 19, of the same number as the sockets 9, which are preferably four. The sockets 19 register with the sockets 9 when the stopper is in position to serve its purpose. In the sockets 19 are the bolts 20, movable freely therein and adapted to engage with the sockets 9 when the two sets of sockets are in register.

The operation of the device is as follows: It is to be observed that the locking and intermediate stoppers, the closing-weight, and the valve are movable in the bottle-neck and are not placed in position until after the bottle is filled in the first instance. The valve-seat is fixed in the neck in any suitable manner, together with the cross-piece for guiding the valve-stem. The liquid with which the bottle is to be filled is poured into the same in the usual manner. Then the valve is dropped into the neck stem first. The elongated stem will prevent the valve from turning, and it will readily drop to its seat. Then the closing-weight is dropped into place. It is to be noted that the longitudinal grooves 5 form passages leading from a point immediately above the valve-seat, past the closing-weight, to the chamber 3. The intermediate stopper 15 is then placed in the neck and is forced into place by the locking-stopper 16, which is inserted afterward. Before the locking-stopper is inserted the bolts 20 are moved back into their sockets in the stopper, and as the latter is held in an upright position they will remain in their sockets while the stopper is being forced into the neck until its flange 17 engages with the shoulders 8 on the ribs 7. The proportions of the locking and intermediate stoppers are such that when the former is forced into place it will move the latter to its proper position between the chambers 3 and 4. After the locking-stopper is in place if the bottle is then inclined then one or more of the bolts 20 will fall into engagement with the sockets 9, and thereby secure the stopper against withdrawal. No matter in what direction the bottle is inclined, at least one of the bolts will fall into its socket in the bottle-neck. When it is desired to pour out the contents of the bottle, it is manipulated in the usual manner. When the bottle is inverted, the closing-weight falls away from the valve and permits the latter to move from its seat. The contents of the bottle then pass through the passages formed by the grooves 5, past the closing-weight, into the chamber 3. From the latter the liquid passes through the spiral passages formed by the grooves 2 around the intermediate stopper to the chamber 4, from which it passes to the mouth of the bottle, past the locking-stopper, through the passages formed by the grooves 6. When the bottle is turned to its upright position, the closing-weight moves the valve back into its seat, and thereby closes the inlet to the interior of the bottle.

It is to be observed that during their length the spiral grooves 2 pass completely around the neck, so that their ends overlap. This will prevent the refilling of the bottle by laying it on its side to unseat the valve, as the liquid cannot follow the passage of the grooves around the entire neck of the bottle.

By the construction hereinbefore described a valve mechanism is produced whereby access to the valve cannot be had nor can the bottle be refilled without destroying the said mechanism.

I do not limit myself to the exact construction herein shown and described, as it can be varied to a considerable extent without departing from the spirit of the invention.

Having thus described my invention, what I claim, and desire to secure by Letters Patent, is—

1. In a valve mechanism for bottles, a neck, a chamber located in said neck near its inner end, a second chamber located in said neck near its outer end, a passage leading from the interior of the bottle to said inner chamber, a valve controlling said passage, a passage leading from said outer chamber to the exterior of the bottle, a stopper placed in the outer end of said neck, means for locking said stopper in place, and spiral passages connecting said chambers leading around said neck and overlapping at its ends.

2. In a valve mechanism for bottles, a neck, a chamber located in said neck near its inner end, a second chamber located in said neck near its outer end, a passage leading from the interior of the bottle to said inner chamber, a valve controlling said passage, a passage leading from said outer chamber to the exterior of the bottle, a stopper placed in the outer end of said neck, means for locking said stopper in place, an intermediate stopper placed between said chambers, and a passage leading past said intermediate stopper and connecting said chambers.

3. In a valve mechanism for bottles, a neck, a chamber located in said neck near its inner end, a second chamber located in said neck near its outer end, a passage leading from the interior of the bottle to said inner chamber, a valve controlling said passage, a passage leading from said outer chamber to the exterior of the bottle, a stopper placed in the outer end of said neck, means for locking said stopper in place, an intermediate stopper placed in said neck between said chambers, and a spiral passage leading past said intermediate stopper to connect said chambers and having its ends overlapping.

4. In a valve mechanism for bottles, a neck, a chamber located in said neck near its inner end, a second chamber located in said neck near its outer end, a passage leading from the interior of the bottle to said inner chamber, a valve controlling said passage, a weight for operating said valve placed in said neck and movable therein, a passage leading from said outer chamber to the exterior of the bottle, a stopper placed in the outer end of said neck, means for locking said stopper in place, and a passage connecting said chambers.

In testimony whereof I hereunto affix my signature in the presence of two witnesses.

DANIEL H. MONKS.

Witnesses:
EDWIN E. STRONG,
BESSIE KEATING.